United States Patent
Zhang et al.

(10) Patent No.: US 10,217,561 B2
(45) Date of Patent: Feb. 26, 2019

(54) WIRELESS POWER TRANSFER COIL SYSTEM USING OFFSET OF ELECTRIC AND MAGNETIC COUPLING FOR FREQUENCY SPLITTING SUPPRESSION

(71) Applicant: SOUTH CHINA UNIVERSITY OF TECHNOLOGY, Guangdong (CN)

(72) Inventors: Xiuyin Zhang, Guangdong (CN); Chengdai Xue, Guangdong (CN); Bin Li, Guangdong (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 131 days.

(21) Appl. No.: 15/529,517

(22) PCT Filed: Dec. 19, 2015

(86) PCT No.: PCT/CN2015/097979
§ 371 (c)(1),
(2) Date: May 25, 2017

(87) PCT Pub. No.: WO2017/084142
PCT Pub. Date: May 26, 2017

(65) Prior Publication Data
US 2017/0358392 A1  Dec. 14, 2017

(30) Foreign Application Priority Data
Nov. 16, 2015 (CN) .......................... 2015 1 0786922

(51) Int. Cl.
*H01F 27/34* (2006.01)
*H01F 27/28* (2006.01)
(Continued)

(52) U.S. Cl.
CPC ............. *H01F 27/34* (2013.01); *H01F 27/28* (2013.01); *H01F 38/14* (2013.01); *H02J 50/10* (2016.02);
(Continued)

(58) Field of Classification Search
None
See application file for complete search history.

(56) References Cited

U.S. PATENT DOCUMENTS

2012/0080957 A1* 4/2012 Cooper .................. H02J 5/005
307/104
2015/0185299 A1* 7/2015 Rinard ............. G01R 33/34046
324/322

(Continued)

FOREIGN PATENT DOCUMENTS

| CN | 101414855 | 4/2009 |
|---|---|---|
| CN | 103414261 | 11/2013 |

(Continued)

OTHER PUBLICATIONS

Wang-Sang Lee, et al., "Distance-Insensitive Wireless Power Transfer and Near-Field Communication Using a Current-Controlled Loop With a Loaded Capacitance," IEEE Transactions on Antennas and Propagation, vol. 62, No. 2, Feb. 2014, pp. 936-940.

*Primary Examiner* — Jared Fureman
*Assistant Examiner* — Aqeel Bukhari
(74) *Attorney, Agent, or Firm* — JCIPRNET

(57) ABSTRACT

A wireless power transfer coil system using offset of electric and magnetic coupling for frequency splitting suppression, which includes one transmitting coil, one receiving coil and four loaded annular metal sheets, is provided. A first annular metal sheet and a second annular metal sheets of the four loaded annular metal sheets are loaded between the transmitting coil and a third and a fourth annular metal sheets of the four loaded annular metal sheets are loaded between the (Continued)

receiving coil to expand a variable distance range of a power transmission. The coil system enables the coils to worked in a state of magnetic and electric coupling. During a process of moving from a long distance to a short distance, a coupling coefficient between the coils changes gradually, but a low coupling degree is still maintained so that a phenomenon of frequency splitting is not produced, thereby maintaining a high-efficiency power transmission within the system.

5 Claims, 2 Drawing Sheets

(51) Int. Cl.
  *H02J 50/10* (2016.01)
  *H02J 50/70* (2016.01)
  *H01F 38/14* (2006.01)
  *H04B 5/00* (2006.01)
  *H02J 50/12* (2016.01)

(52) U.S. Cl.
  CPC .............. *H02J 50/12* (2016.02); *H02J 50/70* (2016.02); *H04B 5/0037* (2013.01); *H04B 5/0012* (2013.01); *H04B 5/0075* (2013.01)

(56) References Cited

U.S. PATENT DOCUMENTS

| | | | |
|---|---|---|---|
| 2015/0207543 A1* | 7/2015 | Cooper | H02J 5/005 307/104 |
| 2016/0081240 A1* | 3/2016 | Lee | H01F 38/14 307/91 |

FOREIGN PATENT DOCUMENTS

| | | |
|---|---|---|
| CN | 103986245 | 8/2014 |
| CN | 104135088 | 11/2014 |
| CN | 204290505 | 4/2015 |

* cited by examiner

WIRELESS POWER TRANSFER COIL SYSTEM USING OFFSET OF ELECTRIC AND MAGNETIC COUPLING FOR FREQUENCY SPLITTING SUPPRESSION

CROSS-REFERENCE TO RELATED APPLICATION

This application is a 371 application of the International PCT application serial no. PCT/CN2015/097979, filed on Dec. 19, 2015, which claims the priority benefit of China application no. 201510786922.4, filed on Nov. 16, 2015. The entirety of each of the abovementioned patent applications is hereby incorporated by reference herein and made a part of this specification.

TECHNICAL FIELD

The present invention relates to a technical field of high-efficiency wireless power transfer systems with a variable distance, and specifically relates to a wireless power transfer coil system using offset of electric and magnetic coupling for frequency splitting suppression.

BACKGROUND

Conventional power transfer mainly depends on a form of wire connection, but wires occupy large amounts of space resources, consume large quantities of metal resources, meanwhile easily produce contacting electric spark, and cause great hidden safety problems to living and life. In addition, in some utilization occasions, the wires could not be utilized for power transfer, but the using of batteries greatly restricts the operating life of devices. Under such backgrounds, people start trying a new power transfer technology, that is, wireless power transfer technology.

In 2007, scientific research personnel at Massachusetts Institute of Technology firstly utilized magnetic resonant coupling to entirely lighten a lamp bulb of 60 W in the case of a distance of 2 m. This technology is named WiTricity technology, and opens a new direction for the development of wireless power transfer technology within a medium range distance. However, the disadvantage of this system is that a fixed distance is needed, and when the distance changes, the system efficiency will be lowered greatly. A great many of succeeding researches all have made improvements based on this. In August 2008, Joshua R. Smith's research group at Intel Seattle laboratory designed a planar-type wireless power transfer device for charging small electronic devices by utilizing wireless power transfer technology with magnetic resonant coupling, showed a system realizing lightening a lamp bulb of 40W at a distance of 60 cm, and published a high-level SCI paper in Industrial Electronics Society magazine in 2011. The system is a system with a variable distance based on frequency-tracking, which could realize a high-efficiency transmission over 75% within a distance of 75 cm. But circuits such as frequency measurement circuit, phase-locked loop circuit and voltage sampling control circuit etc. are needed to be added to the system based on the original WiTricity system, which increases the complexity of the system, and causes some difficulties for realizing debugging and application. In 2014, in a literature <Lee W, Oh K, Yu J, "Distance-Insensitive Wireless Power Transfer and Near-Field Communication Using a Current-Controlled Loop With a Loaded Capacitance," IEEE Transactions on Antennas & Propagation, 2014, 62(2):936-940.>, an antiparallel resonant loop was put forward, which realized an efficiency over 60% within a distance between 0 to 7 cm. Nevertheless, the antiparallel loops weaken the mutual inductances in the weak coupling region and, consequently, of the extension of the operating distance.

SUMMARY OF THE INVENTION

A coil system applying to wireless power transfer within a short distance or a medium distance is proposed in the present invention, aiming at overcoming the above disadvantages existing in the prior art. In the present invention, when the distance between coils changes from a long distance to a short distance, capacitive coupling exists between annular metal sheets and inductive coupling exists between the coils. Due to an offset of magnetic and electric coupling, an increasing tendency of a total coupling coefficient is suppressed, so that the frequency splitting is suppressed, and the coupling coefficient is substantially constant within a certain distance, maintaining a high-efficiency power transmission. When the distance changes from the short distance to the long distance, the capacitive coupling between the annular metal sheets decreases sharply, and the coupling between the coils is mainly inductive coupling, which is relatively weak, with no phenomenon of frequency splitting appearing, and still maintaining a high-efficiency transmission. This coil system could realize a high-efficiency power transfer within a certain distance, relying on a self-adaptive adjustment of the magnetic and electric coupling between the coils. Compared with the similar design, it does not increase the complexity of the original circuit system. The system is simpler and is easier to be tested, meanwhile the distance of the capacitive coupling is relatively close, similarly not affecting the power transfer within a long distance, and having a larger variable distance range.

In order to realize the aim of the present invention, the technical solution using in the present invention is as follows.

A wireless power transfer coil system using offset of electric and magnetic coupling for frequency splitting suppression, comprises one transmitting coil, one receiving coil and four loaded annular metal sheets. A first annular metal sheet and a second annular metal sheet are loaded between the transmitting coil and a third annular metal sheet and a fourth annular metal sheet are loaded between the receiving coil to expand a variable distance range of a power transmission. As magnetic coupling and electric coupling are able to be offset for their opposite polarities, a total coupling strength is equal to a magnetic coupling strength minus an electric coupling strength. When the two coils are close and a separation distance between them decreases, inductive coupling between the transmitting coil and the receiving coil increases, and capacitive coupling between the first annular metal sheet and the third annular metal sheet, and capacitive couplings between the second annular metal sheet and the fourth annular metal sheet also increase. A total coupling coefficient is maintained substantially constant within a certain distance due to the antiphase offset effect of the magnetic and electric coupling, thereby preventing the coupling coefficient from being too large to cause a phenomenon of frequency splitting, and maintaining a high-efficiency power transmission. When the distance between the transmitting coil and the receiving coil is relatively far, the capacitive coupling decreases quickly and becomes quite small. The total coupling strength mainly depends on the inductive coupling among spiral tubes, which also reduces gradually with the increasing of the distance, with no phenomenon of frequency splitting appearing. Therefore, the coil system could realize the high-efficiency power transfer within a certain distance.

Further, a loading mode of the first annular metal sheet, the second annular metal sheet, the third annular metal sheet and the fourth annular metal sheet, and a feeding mode of the transmitting coil and a feeding mode of the receiving coil together constitute a sufficient condition for an offset of magnetic and electric coupling. The transmitting coil is wound clockwise, the receiving coil is wound anticlockwise, and the two coils are wound oppositely. The first annular metal sheet loaded at the transmitting coil is wound opposite to the transmitting coil, with its end being connected to an end of the transmitting coil via a wire; the second annular metal sheet loaded at the transmitting coil is wound opposite to the transmitting coil, with its end being connected to the transmitting coil via a wire; the third annular metal sheet loaded at the receiving coil is wound opposite to the receiving coil, with its end being connected to the receiving coil via a wire; and the fourth annular metal sheet loaded at the receiving coil is wound opposite to the receiving coil, with its end being connected to the receiving coil via a wire, which together results in that an electric field vector and a magnetic field vector between the transmitting coil and the receiving coil are opposite, constituting a necessary condition for the offset of magnetic and electric coupling. In addition, the number of turns of the transmitting coil is an odd number, from up to down being a first turn and a last turn, respectively, and the transmitting coil is wound clockwise, with its two ends being open, and a turn in the middle being interrupted from the middle as a feeding port of a high-frequency power source. The number of turns of the receiving coil is an odd number, from up to down being a first turn and a last turn, respectively, and the receiving coil is wound anticlockwise, with its two ends being open, and a turn in the middle being interrupted from the middle as a feeding port for receiving power. The ends of the coils are open in such way, so that electric field effect increases at the ends.

Further, a resonance mode of the transmitting coil and receiving coil constitutes a basic condition for the offset of magnetic and electric coupling. Lengths of the transmitting coil and the receiving coil are consistent, both being a quarter wavelength of working frequency, so that the coils could be resonant near the working frequency by using the stray capacitance of themselves, and are equivalent to a series resonance. Therefore, the coil system is not necessary to additionally load resonant capacitance, reducing the resonant capacitance of itself as much as possible, thereby improving a mutual capacitance coefficient between the coils, so that it achieves an order of magnitudes same as a mutual inductance system, and thereby the mutual capacitance coefficient and the mutual inductance coefficient are offset mutually, forming the character of the offset of magnetic and electric coupling.

Further, an expanded transmission distance range depends on widths of the loaded first annular metal sheet, the second annular metal sheet, the third annular metal sheet and the fourth annular metal sheet. A coupling capacitance between the transmitting coil and the receiving coil mainly is mainly constituted by series connection of capacitances between the loaded first annular metal sheet and the third annular metal sheet, and between the second annular metal sheet and the fourth annular metal sheet. In order to maximize the coupling capacitance between the coils to offset energy of coupling inductance, the width of each annular metal sheet maintains consistent, and by adjusting the width, the mutual capacitance coefficient between the coils is adjusted, and thereby an offset degree of the electric coupling to the magnetic coupling is directly adjusted. As the total coupling is equal to the magnetic coupling minus the electric coupling, finally a total coupling coefficient changes gradually with the distance, so that the variable distance range is expanded.

Further, the first annular metal sheet and the second annular metal sheet that loaded are mutually engaged with the transmitting coil, and the third annular metal sheet and the fourth annular metal sheet that are loaded are mutually engaged with the receiving coil, which will not greatly increase a volume of the original coils. Two sides of an opening of the transmitting coil are respectively loaded with the first annular metal sheet and the second annular metal sheet, and these two annular metal sheets both are on a same plane with a last turn of the transmitting coil, each being a semi-circular ring of 180 degrees, having an inner diameter slightly larger than the transmitting coil, being subject to not contact with the transmitting coil, the inner diameter being expanded outward to form the annular metal sheets with certain widths. The first annular metal sheet and the second annular metal sheet are separated from each other at a distance, and are not connected end-to-end. Such loading mode will not increase a thickness of the transmitting coil, but just increases the width of the metal sheets in a radial direction of the transmitting coil, and actually this width is very small compared with the radius of the coil. Thus, the mode for loading metal sheets itself will not greatly increase the volume of coil. Two sides of an opening of the receiving coil are respectively loaded with the third annular metal sheet and the fourth annular metal sheet, and these two annular metal sheets both are on a same plane with a last turn of the receiving coil, each being a semi-circular ring of 180 degrees, having an inner diameter slightly larger than the receiving coil, being subject to not contact with the receiving coil, the inner diameter being expanded outward to form the annular metal sheets with certain widths. The third annular metal sheet and the fourth annular metal sheet are separated from each other at a distance, and are not connected end to end. Such loading mode will not increase a thickness of the receiving coil, but just increases the width of the metal sheets in a radial direction of the receiving coil, but actually the width is very small compared with the radius of the coil. Therefore, the mode for loading metal sheets itself will not greatly increase the volume of coil.

Compared with the prior art, the present invention has advantages as follows:

(1) the wireless power transfer coil system according to the present invention could maintain high-efficiency by self-adaptively adjusting the coupling degree according to the transmission distance, which doesn't need to add additional control circuit, therefore the cost of the system will not be increased, meanwhile, the system is simpler and is convenient for debugging and application;

(2) only a section of annular metal sheet with a relative small width is loaded around the coil in the present invention, which maintains high-efficiency in a variable distance, meanwhile makes sure that the volume will not be greatly increased, so that the coils are easier to be fitted to the actual system.

DETAILED DESCRIPTION OF THE INVENTION

In combination with the following embodiments and accompanying drawings, the present invention is further described in detail below, but the implementations of the present invention are not limited thereto.

Figure 1:
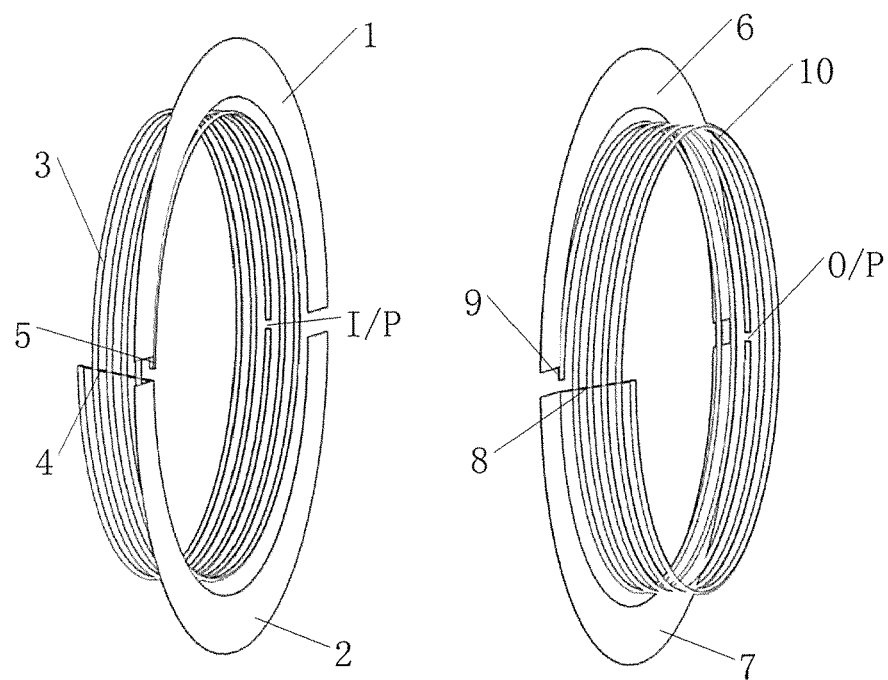
FIG. 1 is a structural view of the wireless power transfer coil system using offset of electric and magnetic coupling for frequency splitting suppression according to the present invention.

As shown in FIG. 1, a wireless power transfer coil system using offset of electric and magnetic coupling for frequency splitting suppression, comprises two receiving and transmitting coils and loaded annular metal sheets. The two coils are wound oppositely and mutually symmetric. A distance between the coils is a wireless power transfer distance. Two sides of an opening of the transmitting coil 3 are respectively loaded with a first annular metal sheet 1 and a second annular metal sheet 2. These two annular metal sheets both are on a same plane with a last turn of the transmitting coil, each being a semi-circular ring of 180 degrees, having an inner diameter slightly larger than the transmitting coil, being subject to not contact with the transmitting coil, the inner diameter being expanded outward to form the annular metal sheets with certain widths. The first annular metal sheet 1 and the second annular metal sheet 2 are separated from each other at a distance, and are not connected end-to-end. Such loading mode will not increase the thickness of the transmitting coil, but just increases the width of the metal sheet in the radial direction of the transmitting coil, and actually this width is very small compared with the radius of the coil. Thus, the mode of loading the metal sheets itself will not greatly increase the volume of the coil. Two sides of an opening of the receiving coil 10 are respectively loaded with a third annular metal sheet 6 and a fourth metal sheet 7. These two annular metal sheets both are on a same plane with a last turn of the receiving coil, each being a semi-circular ring of 180 degrees, having an inner diameter slightly larger than the receiving coil, being subject to not contact with the receiving coil, the inner diameter being expanded outward to form the annular metal sheets with certain widths. The third annular metal sheet 6 and the fourth annular metal sheet 7 are separated from each other at a distance, and are not connected end-to-end. From a long distance to a short distance, capacitive coupling exists between the first metal sheet 1 and the third metal sheet 6, and between the second metal sheet 2 and the fourth metal sheet 7, respectively, and inductive coupling exists between the transmitting coil 3 and the receiving coil 10. As the offset of magnetic and electric coupling, the coupling coefficient may maintain substantially constant within a certain distance, maintaining the high-efficiency power transmission. At the long distance, it is mainly the inductive coupling between the coils, which is relatively weak, with no frequency splitting appearing, and still maintaining a high-efficiency transmission. Thus, the present coil system could realize the high-efficiency power transfer within a certain distance.

Embodiment

Figure 2:
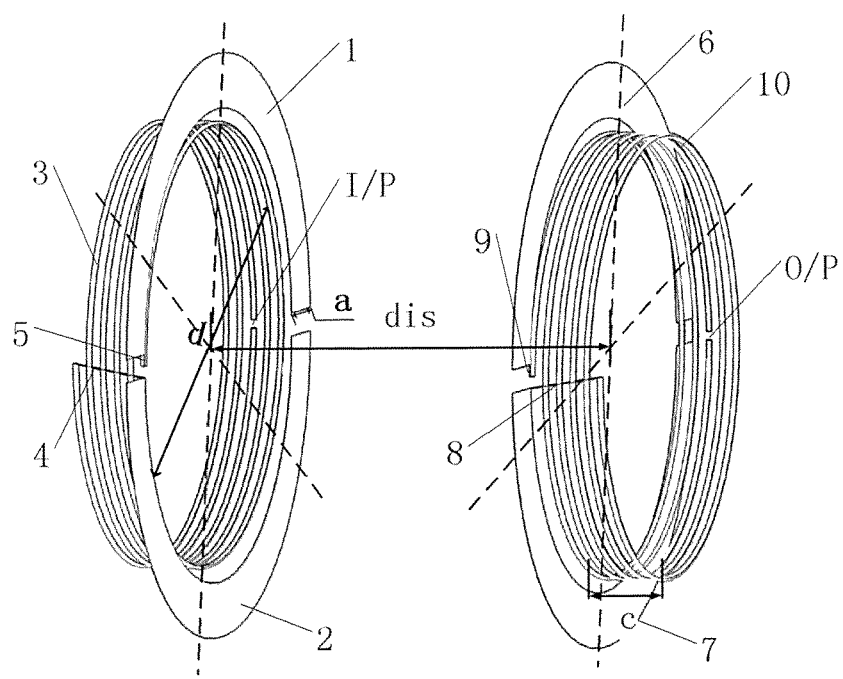
FIG. 2 is a dimensioned drawing of the wireless power transfer coil system using offset of electric and magnetic coupling for frequency splitting suppression.

A structure of a wireless power transfer coil system using offset of electric and magnetic coupling for frequency splitting suppression is shown in FIG. 1. Related dimensions are shown in FIG. 2, wherein a thickness of the selected metal sheet is 2 mm, a distance between the coils is dis, and the specific circuit dimensions are selected as follows: the diameter d of the coil=185 mm, the width a of the metal sheet is 25 mm, the thickness c of the coil=30 mm, the diameter r of the coil copper wire=2 mm, and the total dimension is 235 mm×235 mm.

Figure 3:
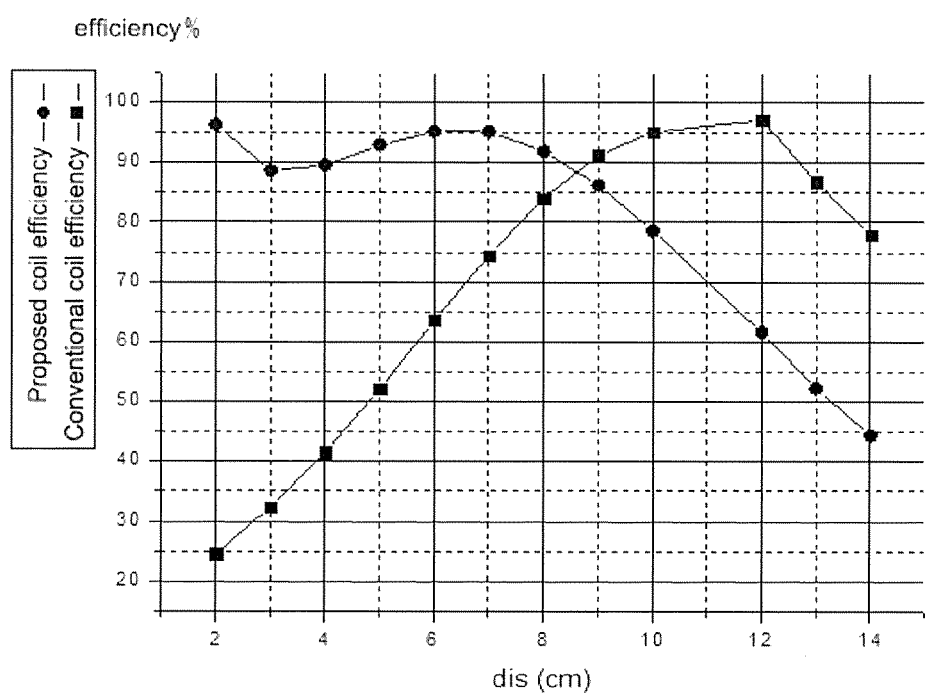
FIG. 3 is a simulation result of the transmission efficiency of the coil system changing with distance.

FIG. 3 is a simulation result of transmission efficiency of the coil system changing with distance, from which it can be seen that, the original coils have an efficiency over 80% only within 8 cm to 14 cm, and the variable distance range is only 6 cm, and the efficiency sharply reduces when the coils are close. However, the improved coils have a transmission efficiency over 80% within 0 to 10 cm, and the variable distance range is 10 cm. The present invention provides a design of the transmitting coil and receiving coil which is applied to the wireless power transfer system with a variable distance within a short distance or a medium distance, maintaining the high efficiency, meanwhile increasing the transmission distance.

The embodiment described above is a better embodiment in the present invention, but isn't used to limit the present invention. Based on the embodiment of the present invention, in the premise without contributing any creative works, other embodiments obtained from any modifications, equal substitutions and improvements made by those skilled in the art based on the present invention, should be all included in the scope of protection of the embodiment of the present invention.

What is claimed:

1. A wireless power transfer coil system using offset of electric and magnetic coupling for frequency splitting suppression, comprising:
   a transmitting coil;
   a receiving coil;
   four loaded annular metal sheets, comprising a first annular metal sheet, a second annular metal sheet, a third annular metal sheet and a fourth annular metal sheet, wherein the first annular metal sheet and the second annular metal sheet are loaded between the transmitting coil and the third annular metal sheet and the fourth annular metal sheet are loaded between the receiving coil to expand a variable distance range of a power transmission,
   wherein as magnetic coupling and electric coupling are able to be offset due to having opposite polarities, a total coupling strength is equal to a magnetic coupling strength minus an electric coupling strength, when the transmitting coil and the receiving coil are close and a distance therebetween decreases, inductive coupling between the transmitting coil and the receiving coil increases, and capacitive couplings between the first annular metal sheet and the third annular metal sheet, and between capacitive coupling between the second annular metal sheet and the fourth annular metal sheet also increase, thereby preventing a phenomenon of frequency splitting from being produced due to a coupling coefficient being too large, and maintaining a high-efficiency power transmission, and when the distance between the transmitting coil and the receiving coil is relatively far, the capacitive coupling decreases quickly and becomes quite small, and the total coupling strength, which mainly depends on the inductive coupling among spiral tubes, also reduces gradually with no phenomenon of frequency splitting appearing as the distance between the transmitting coil and the receiving coil increases.

2. The wireless power transfer coil system using the offset of electric and magnetic coupling for frequency splitting suppression according to claim 1, wherein a winding mode of the transmitting coil and the receiving coil, a loading mode of the first annular metal sheet, the second annular metal sheet, the third annular metal sheet and the fourth annular metal sheet, and a feeding mode of the transmitting coil and a feeding mode of the receiving coil together constitute a sufficient condition for an offset of magnetic and electric coupling, wherein the transmitting coil is wound clockwisely and the receiving coil is wound counterclockwisely such that the transmitting coil and the receiving coil are wound oppositely, the first annular metal sheet loaded at the transmitting coil is wound opposite to the transmitting coil with an end thereof being connected to an end of the transmitting coil via a first wire, the second annular metal sheet loaded at the transmitting coil is wound opposite to the transmitting coil with an end thereof being connected to the transmitting coil via a second wire, the third annular metal sheet loaded at the receiving coil is wound opposite to the receiving coil with an end thereof being connected to the receiving coil via a third wire, and the fourth annular metal sheet loaded at the receiving coil is wound opposite to the receiving coil with an end thereof being connected to the receiving coil via a fourth wire, which together result in that an electric field vector and a magnetic field vector between the transmitting coil and the receiving coil are opposite, thereby constituting a necessary condition for the offset of magnetic and electric coupling, and wherein the number of turns of the transmitting coil is an odd number, from up to down being a first turn and a last turn, respectively, the transmitting coil is wound clockwisely with two ends thereof being open and a turn in the middle being interrupted from the middle to serve as a feeding port of a high-frequency power source, and the number of turns of the receiving coil is an odd number, from up to down being a first turn and a last turn, respectively, the receiving coil is wound counterclockwisely with two ends being open and a turn in the middle being interrupted from the middle to serve as a feeding port for receiving power.

3. The wireless power transfer coil system using the offset of electric and magnetic coupling for frequency splitting suppression according to claim 1, wherein a resonance mode of the transmitting coil and receiving coil constitutes a basic condition for an offset of magnetic and electric coupling, and lengths of the transmitting coil and the receiving coil are consistent, both being a quarter wavelength of a working frequency.

4. The wireless power transfer coil system using offset of electric and magnetic coupling for frequency splitting suppression according to claim 1, wherein an expansion of a transmission distance range depends on widths of the first annular metal sheet, the second annular metal sheet, the third annular metal sheet and the fourth annular metal sheet that are loaded, a coupling capacitance between the transmitting coil and the receiving coil is mainly constituted by a series connection of capacitances between the first annular metal sheet and the third annular metal sheet that are loaded, and between the second annular metal sheet and the fourth annular metal sheet that are loaded, the width of each annular metal sheet maintains consistent, an offset degree of the electric coupling to the magnetic coupling is directly adjusted through adjusting the widths and a mutual capacitance coefficient between the transmitting coil and the receiving coil, and as the total coupling is equal to the magnetic coupling minus the electric coupling, a total coupling coefficient changes gradually with the distance, so that the variable distance range is expanded.

5. The wireless power transfer coil system using offset of electric and magnetic coupling for frequency splitting suppression according to claim 1, wherein the first annular metal sheet and the second annular metal sheet are mutually engaged with the transmitting coil, and the third annular metal sheet and the fourth annular metal sheet are mutually engaged with the receiving coil, so that volumes of the transmitting coil and the receiving coil do not increase greatly, wherein two sides of an opening of the transmitting coil are respectively loaded with the first annular metal sheet and the second annular metal sheet, and the first and second annular metal sheets, each being a semi-circular ring of 180 degrees and having an inner diameter larger than the transmitting coil, are both on a same plane with the last turn of the transmitting coil, such that the first and second annular metal sheets do not contact with the transmitting coil, are not connected end-to-end, wherein two sides of an opening of the receiving coil are respectively loaded with the third annular metal sheet and the fourth annular metal sheet, and the third and fourth annular metal sheets, each being a semi-circular ring of 180 degrees and having an inner diameter larger than the receiving coil, are both on a same plane with the last turn of the receiving coil, such that the third and fourth annular metal sheets do not contact with the receiving coil, are separated from each other, and are not connected end-to-end.

\* \* \* \* \*